R. L. GRAVES.
PIPE COUPLING.
APPLICATION FILED OCT. 3, 1908.

991,501.

Patented May 9, 1911.

Witnesses

Inventor
Richmond L. Graves.
By C. A. Snow & Co.
Attorneys

UNITED STATES PATENT OFFICE.

RICHMOND L. GRAVES, OF MEMPHIS, TENNESSEE, ASSIGNOR OF ONE-HALF TO WILLIAM A. HARDWICK, OF MEMPHIS, TENNESSEE.

PIPE-COUPLING.

991,501.  Specification of Letters Patent.  Patented May 9, 1911.

Application filed October 3, 1908. Serial No. 455,998.

*To all whom it may concern:*

Be it known that I, RICHMOND L. GRAVES, a citizen of the United States, residing at Memphis, in the county of Shelby and State of Tennessee, have invented a new and useful Pipe-Coupling, of which the following is a specification.

This invention relates to pipe couplings; and has for its object to provide a strong and simple universal coupling for steam, water, air, gas, and other pipes, said coupling comprising few parts rotatably connected by fluid tight joints and held against disengagement through the medium of a firm and easily applied anti-friction locking means.

With this and other objects in view the invention consists of the novel construction, combination and arrangement of parts hereinafter described and claimed and illustrated in the accompanying drawing, in which—

Figure 1:
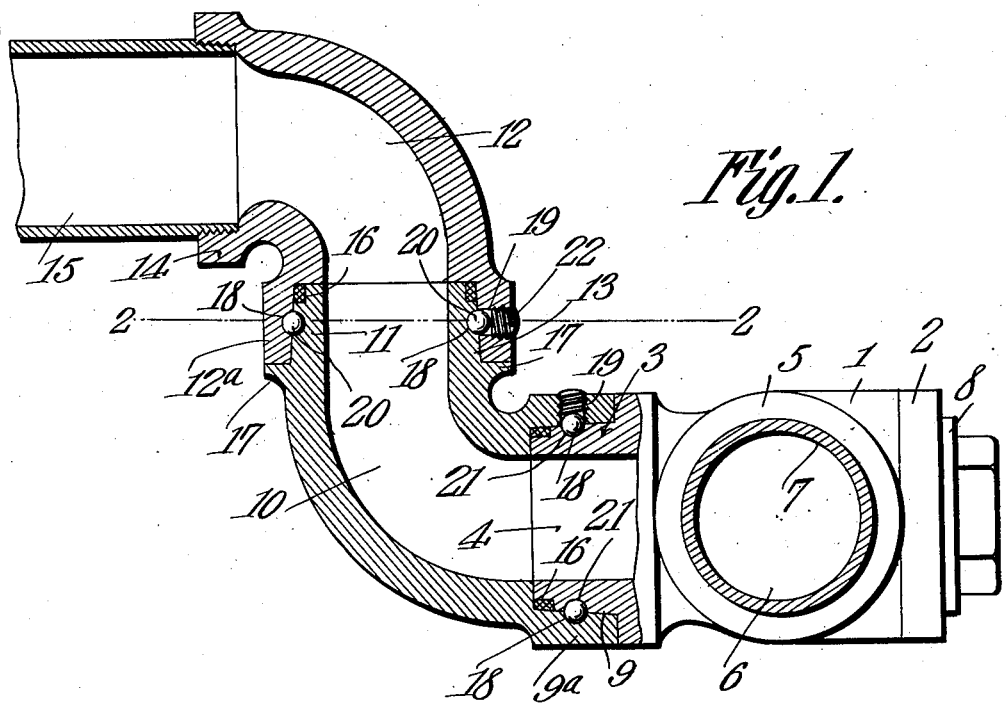
Figure 2:
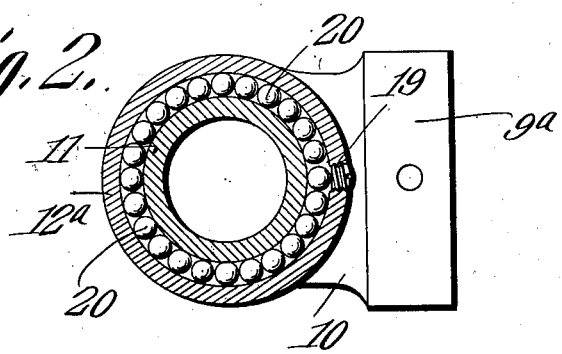

Figure 1 is a central sectional view of the improved pipe coupling, and Fig. 2, a cross sectional view on the line 2—2 of Fig. 1.

Similar reference numerals are used for the same parts in all the figures.

In the drawings, the numeral 1 indicates a fitting having a neck 2 at one end and a tapering plug 3 at its other end. Through the fitting 1 a bore 4 is made, screw-threaded at the neck end for a pipe. A second neck 5 projects from the fitting 1 at a right angle thereto and is provided with a threaded bore 6 of like diameter as the bore 4 and opening into the same. A pipe 7 may be screwed into either bore as circumstances require, but in the drawing it is represented as entering the right angle bore 6. The unused bore 4 is closed by a cap or plug 8 which is also employed to close the bore 6 when the pipe is attached to the neck 2.

The tapered plug 3 on the fitting 1 is ground snugly into a similarly shaped seat 9 in the enlarged end $9^a$ of a right angle coupling member 10, the opposite end thereof being provided with a tapered plug 11 similar to the plug 3.

A second right angle coupling member 12 is enlarged at both ends; one end $12^a$ having a tapered seat or socket 13 within which the plug 11 is adapted to turn, while the other end 14 is threaded for a pipe 15. The extreme end of each plug 3 and 11 is fitted with an expansible packing ring 16 made of a metal or alloy having a greater ratio of expansion under increasing temperature than the metal of which the coupling is made. On the coupling member 10 at the base of the tapered plug 11 is an exterior flange or collar 17 flat on the plug side to form a seat for the extremity of the enlargement $12^a$ of the member 12.

It is to be noted that while the plugs 3 and 11 are ground to a close smooth fit with their respective sockets and made fluid tight by the packing rings 16, the several parts would quickly separate were no means provided to retain them in place. For this purpose, therefore, a semicircular groove 18 is cut circumferentially in each plug 3 and 11, and in their sockets which grooves coincide when the parts are assembled and form a tubular channel between them. A hole 19 is bored in a radial direction through the socket end of each coupling member as far as the channel 18 for the purpose of introducing therethrough to the channel the means for preventing the withdrawal of the tapered plug from its socket, as for instance filling the grooves with anti-friction balls 20, the holes 19 being tapped for screws 22 to prevent the escape of said balls.

What is claimed is:—

A pipe coupling comprising three members, one of the terminal members having a tapered extension provided externally at its extreme end with a packing ring having a greater ratio of expansion than the material of the coupling, and the other terminal member being provided with a tapered bore, an intermediate member having a tapered extension provided externally at its extreme end with a packing ring having a greater ratio of expansion than the material of the coupling, the other terminal of the intermediate member having a tapered bore to engage the tapered extension of the first named member, the intermediate portion of each extension and of each bore being provided with a circumferential groove, the two grooves being arranged to register, and a filler disposed within the grooves to prevent separation of the parts of the coupling but to permit free swiveled movement relative to each other, the disposition of the packing rings being such as to secure a liquid tight joint between the members.

In testimony that I claim the foregoing as my own, I have hereto affixed my signature in the presence of two witnesses.

RICHMOND L. GRAVES.

Witnesses:
 JAMES R. ISBELL,
 HENRY SCHINDLE.